United States Patent [19]

Campbell

[11] Patent Number: 5,114,098
[45] Date of Patent: May 19, 1992

[54] AIRCRAFT ENGINE PROTECTIVE COVER

[75] Inventor: Teddy G. Campbell, Brookfield, Conn.

[73] Assignee: Texaco Inc., White Plains, N.Y.

[21] Appl. No.: 521,868

[22] Filed: May 11, 1990

[51] Int. Cl.⁵ .................. B64D 37/32; B65D 65/04
[52] U.S. Cl. .................. 244/121; 244/1 R; 244/129.4; 150/157
[58] Field of Search .......... 150/154, 157, 166; 244/121, 129.4, 1 R, 53 R, 135 R

[56] References Cited

U.S. PATENT DOCUMENTS

| | | | |
|---|---|---|---|
| 2,744,302 | 5/1956 | Sokol et al. | 244/129.4 |
| 2,804,903 | 9/1957 | Davies | 150/157 |
| 3,143,154 | 8/1964 | Best | 150/154 |
| 3,646,980 | 3/1972 | Peterson | 150/157 X |
| 4,598,883 | 7/1986 | Suter | 244/1 R |
| 4,961,550 | 10/1990 | Hujsak | 244/121 |
| 4,961,989 | 10/1990 | Grimwood | 244/1 R |

Primary Examiner—Joseph F. Peters, Jr.
Assistant Examiner—Carla Mattix
Attorney, Agent, or Firm—Robert A. Kulason; James J. O'Loughlin; Robert B. Burns

[57] ABSTRACT

This invention relates to a shroud or flexible wall cover which is adapted to be placed onto the nacelle of an aircraft engine. The shroud is positioned to cover the nacelle discharge port through which hot, high velocity exhaust gases normally are discharged. The formation of a provisional closure across the exhaust gas discharge port precludes the entry of fumes and/or mist from inadvertently spilled fuel entering the discharge port and igniting when coming into contact with hot engine parts. The shroud is provisionally placed into operating position immediately prior to a transfer of fuel from a fueling vehicle into the wind tanks of the aircraft.

6 Claims, 3 Drawing Sheets ic ENGINE PROTECTIVE COVER

BACKGROUND OF THE INVENTION

In many types of aircraft, particularly those utilizing multiple jet engines, the latter are mounted in an underslung position on the aircraft's wings. The engines or power units are normally surrounded by a streamlined, cylinder-like closure or nacelle. The latter is shaped to intake air at one end, which is guided to the jet engine, and then discharged through an exhaust port as hot gas.

It is also customary in aircraft design to position fuel tanks inside the aircraft wings. As a practical matter, locating fuel tanks near to the wing supported engines, facilitates metering of the fuel to control the engines.

Normally, when an aircraft has landed after a flight, and is to continue to another destination, common practice in the industry is to position a mobile refueling vehicle underneath, or adjacent to the aircraft wings. Thus, fuel can be pumped upwardly through a fuel hose at the underside of the wing, and into the wing tanks.

On occasion, due to a defect in fuel pumping equipment, or to human error or accident at the loading site, fuel under pressure will be discharged into the atmosphere and onto the ground. The released fumes, being lighter than air, will tend to rise. Raw fuel under pressure will be released into the surrounding area.

If the aircraft's engines have been operating within sufficiently hot temperatures to exceed the auto ignition temperature of the fuel vapor and mist contact of the vapors with such hot parts could trigger ignition. The ensuing flames and/or explosion could prompt injury or even death to personnel in the vicinity. The aircraft will also suffer damage or complete destruction in the conflagration.

Toward precluding this undesired eventuality, there is presently provided a flexible wall shroud member adapted to operate in conjunction with an aircraft refueling operation. The shroud is shaped such that it can be folded and stored conveniently when not in use. However, it can be readily opened and registered onto an engine nacelle.

The shroud is conformed that it will cover only the discharge end of an engine nacelle where hot gases are discharged into the atmosphere and where the engine parts retain the greatest heat. It thus furnishes a protective shield or provisional enclosure across the nacelle discharge port.

It is therefore an object of the invention to provide means for safely permitting the transfer of vaporous fuel into an aircraft fuel tank, while minimizing the possibility of fuel vapor and/or mist ignition.

A further object is to provide a flexible wall closure which provisionally engages a portion of an aircraft engine nacelle, thereby defining a closure across the latter's discharge port which would otherwise allow access of vapor and fuel mist to hot engine parts.

Figure 1:
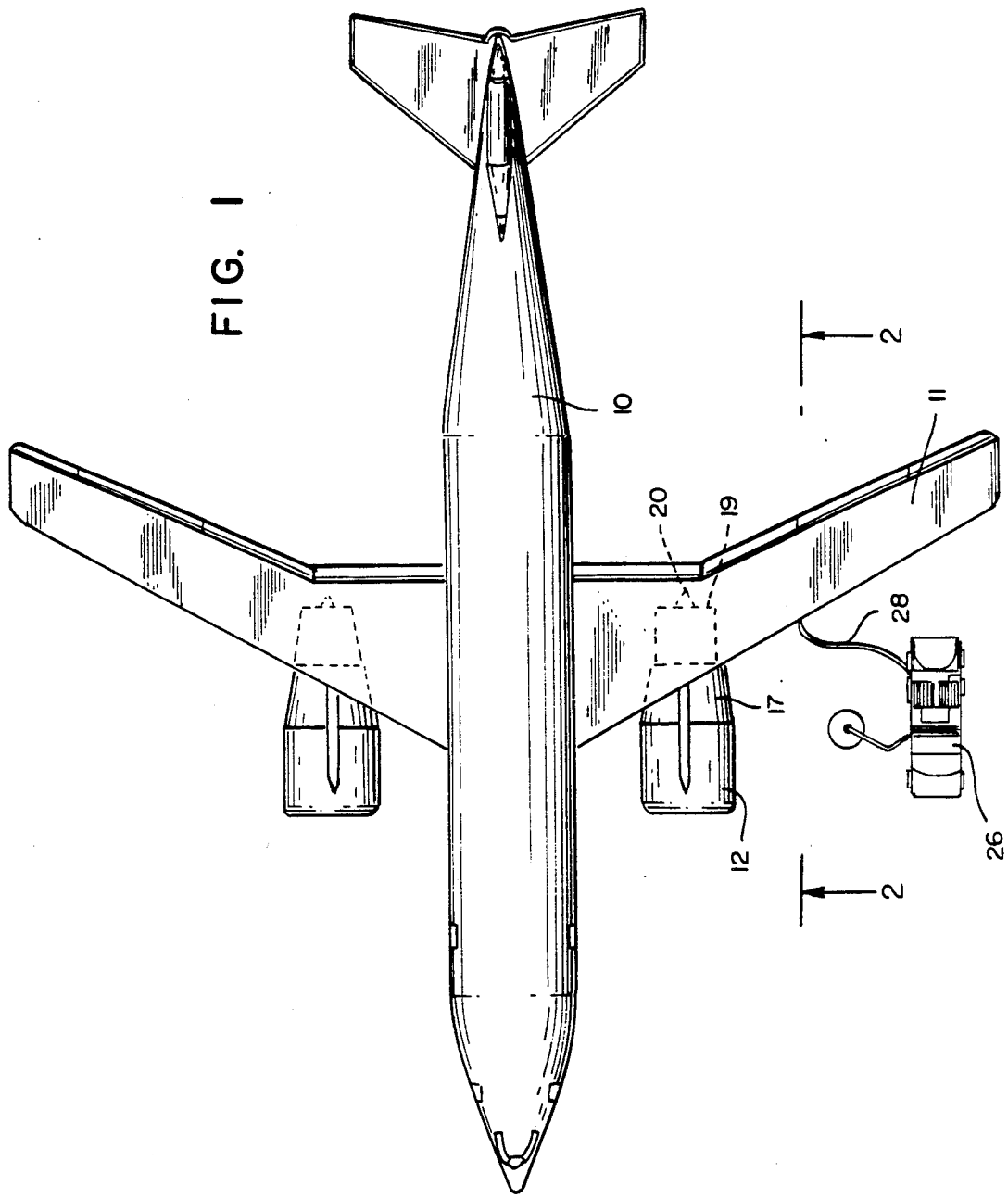
FIG. 1 is an environmental view of an aircraft of the type contemplated, illustrating a fuel transfer operation.

Referring to the drawings, an aircraft 10 of the type to which the present invention applies can assume any of a number of configurations without departing from the novel concept of the invention. Illustrative of such an aircraft is the type wherein wing 11 is sufficiently large that an engine 12 or a plurality of engines can be mounted in an underslung position beneath the wing.

Engine 12 as shown, is connected in supporting relation to the underside of wing 11 by a support brace 14. The latter is normally provided with a shaped housing to assure streamlining of the structure to minimize resistance as the craft travels through the air.

Figure 2:
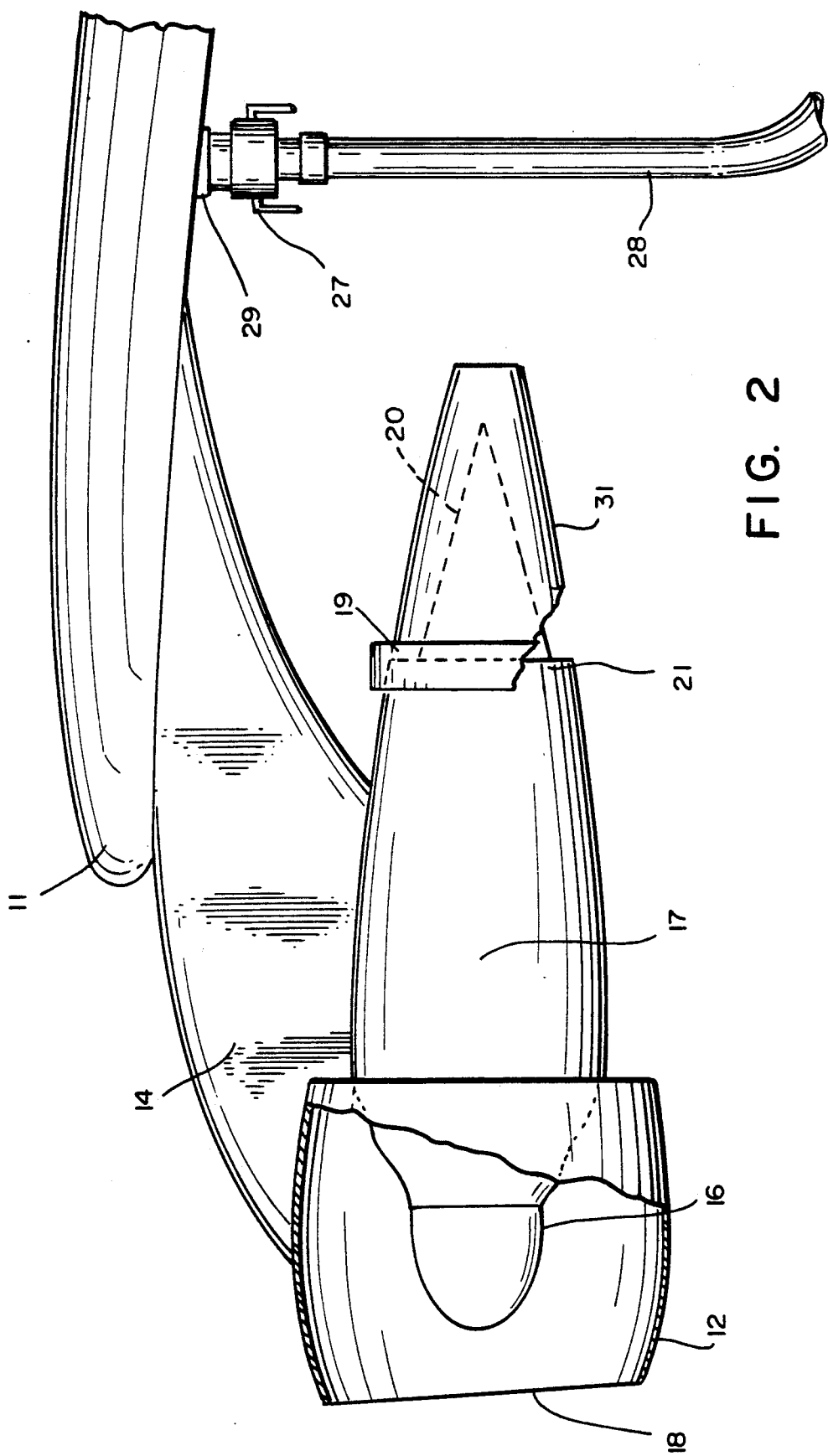
FIG. 2 is an enlarged view in cross-section taken along line 2—2 in FIG. 1.

Engine 12 as shown in FIG. 2, includes an internal jet power plant 16 which is provided with an external, nacelle 17. The latter is generally, as a matter of convenience, fashioned in discrete, individual segments. Preferably, nacelle 17 is cylindrical in configuration, having an enlarged air intake opening 18 at the forward end and an annular exhaust gas discharge port 19 at the rear end. This structure will allow nacelle segments to be removed individually and permit access to various parts of power plant 16. The nacelle is normally fabricated of aluminum or titanium, the segments being held in position by a suitable fastening means such as screws, rivets, etc.

The forward end of nacelle 17 is shaped with a rounded edge at enlarged opening 18 to allow entry of air into jet power plant 16 as the aircraft moves rapidly through the atmosphere. The nacelle's discharge or rear end port 19 is defined by a peripheral rim 21.

A conically shaped gas flow guide 20 positioned coaxial of nacelle 17, extends rearwardly from the discharge port to define port 19 into an annular opening. Said member functions to guide engine exhaust gases into the atmosphere.

The plane's fuel holding tanks are normally positioned in the wings, preferably adjacent to the aircraft body. To facilitate a fuel loading operation, an access opening to the respective fuel tanks is formed into the wing undersurface. This positioning permits ground personnel to simplify a refueling operation by locating a mobile fueling vehicle 26 adjacent to the wing. Thereafter communication is achieved through a flow control nozzle 27 which sealably engages fuel loading port 29 by way of a hose 28.

Prior to commencing pressurized flow from the mobile fueling vehicle 26 into the aircraft tanks, a shroud 31 is disposed over at least a part of the engine nacelle 17 surface. Shroud 31 is formed of a flexible or non-rigid material which facilitates its being folded into a compact unit for storage on the fueling vehicle or in ancillary carrying means. The resiliency of shroud 31 will cause the shroud fabric to conform to the contour of nacelle surface when supported thereon.

Figure 3:
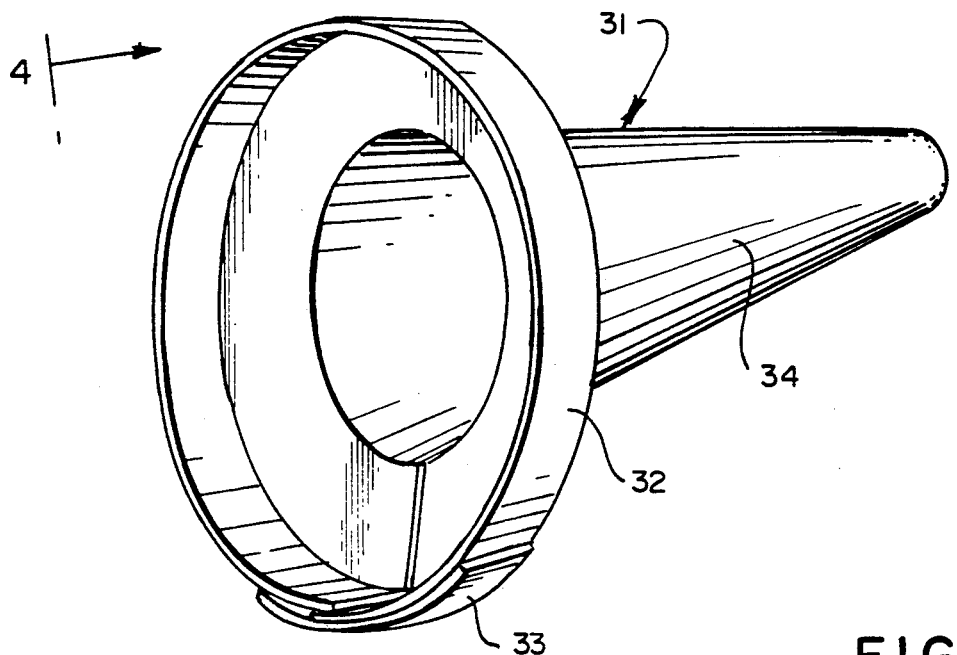
FIG. 3 is an enlarged view of an engine's removable shroud.

Referring to FIG. 3, Shroud 31 is shaped to be manually slid onto the rear portion or discharge end of nacelle 17. The shroud includes an elongated conical body 34 having an adjustable collar 32. Collar 32 is comprised of a periplheral lip 41 which engages the enlarged end of body 34 by way of an intermediate segment 42. Since the shroud is formed of a reinforced fabric or the like, the pieces and segments which comprise the whole unit are preferably joined through several seams.

The shroud, when properly placed, forms a generally conical configuration extending rearwardly from fastening collar 32, being supported by the nacelle's surface as well as by the protruding conical exhaust gas guide 20. In effect, shroud 31 in its reclining position on the engine nacelle, defines a closure across the entire rear of the nacelle as well as the annular discharge port 19 between rim 21 and conical gas guide member 20.

To fix, or provisionally fasten shroud 31 in place, means is provided at collar 32 such that the latter can be contracted or drawn tightly around the periplheral nacelle rim 21 to a sufficient degree to avoid the shroud falling from the nacelle. Without proper fastening, the shroud could be dislodged accidentally, particularly in an open area, due to the wind blowing it from its position. Collar 32 can therefore be provided with an external belt 33 or an internal drawstring type arrangement. Either alternative would allow the collar to be pulled tight into a constricted peripheral seal when it is in place on rim 21.

Alternatively, the shroud might be adjusted into the tight, sealed position by a Velcro connection wherein cooperating elements of the Velcro member are positioned on corresponding segments of collar 32. Firm positioning of the collar about rim 21, whether it be a belt, a Velcro connection, or other, will permit the shroud to accommodate, or be adapted to a number of different nacelle configurations. This is a desired feature since all aircraft engines do not conform to a common dimension.

Shroud 31 is constructed preferably to be of a quasi-rigid nature, with a conical rear portion which, as noted, engages rearwardly extending conical gas guide 20. Thus, during a refueling operation, should the pressure hose 28 which connects the fueling vehicle fuel pump, with flow control nozzle 27, be inadvertently broken or subjected to sufficient strain as to rupture, a tragic and expensive accident will be avoided. The pressurized fuel flow can be discharged into the atmosphere in the vicinity of the fueling vehicle and/or aircraft with minimal concern of the vapors igniting. Since the exhaust gas discharge port 19 is provided with a closure by means of the shroud, ignitable fuel mist and vapors emanating from spilled or discharged fuel, will be blocked from entering the nacelle discharge port to contact the hot engine parts.

At the completion of a refueling sequence, loading hose 28 and its flow control nozzle 27 are disconnected from the wing fuel inlet port 29. Shroud 31 is detached by loosening fastening collar 32 from its sealed condition about the nacelle discharge ring 21. Shroud 31 will thereby be loose enough to be slid rearwardly across conical element 20. It can thereafter be folded into a more compact form until its use is again required.

Structurally, shroud 31 is formed of a composite material such as fiberglass impregnated canvas to furnish the member sufficient strength, as well as a degree of resiliency. To endure normal handling under severe operating conditions, the shroud material must further be heat resistant to a minimum temperature of about 1000° F. Preferably, and as mentioned, a material suitable to this application would be a composite of one or more fabrics which are layered or impregnated with a strengthening agent.

Figure 4:
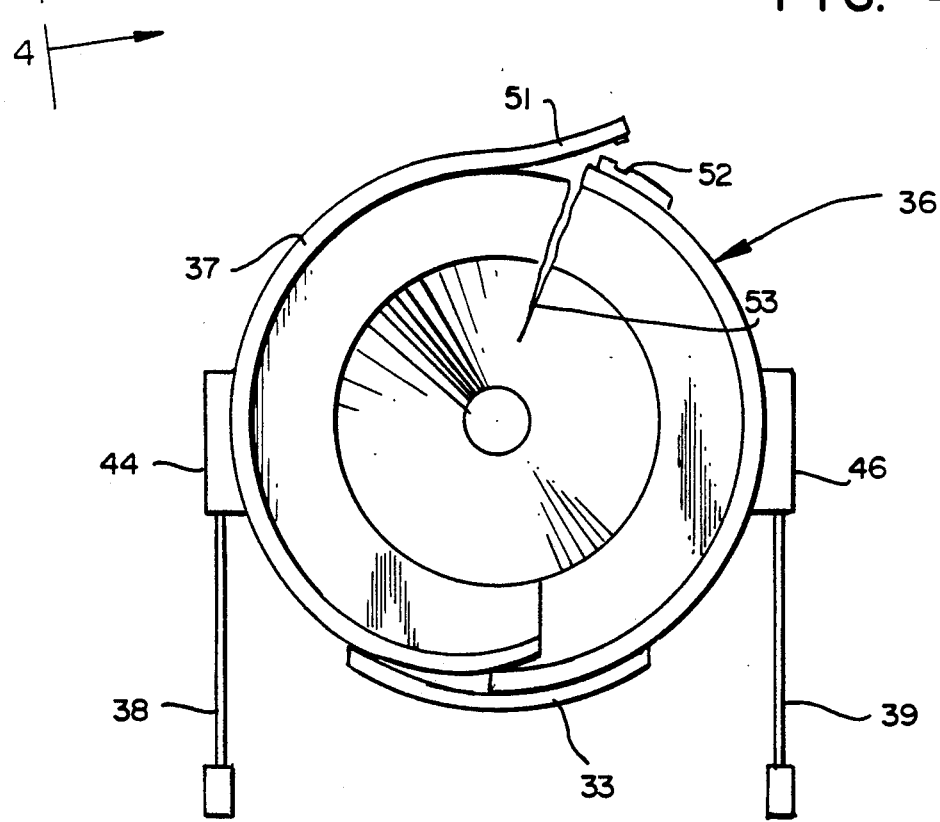
FIG. 4 is a view taken along line 4—4 in FIG. 3.

Referring to FIG. 4, in one embodiment shroud 36 when unfolded, takes the preferred configuration of a generally conical body segment having a closed cap at one end, and a periplherally adjustable collar 37 at the other. To facilitate shroud 36 being manually placed onto an engine nacelle, collar 37 can be provided with extended rods 38 and 39 at opposite sides of collar 37 at rod end sockets 44 and 46. Thus, the shroud can be lifted manually to a height wherein the opened shroud can be pulled along the rear end of an engine nacelle to engage the discharge opening rim or the outer surface of the nacelle whereby to be firmly fastened in place.

To further facilitate a proper fit between the shroud and an engine nacelle, collar 37, as shown in FIG. 4, can include an adjusting section at which the collar ring is split. Each side of the split, i.e. 51 and 52, can be provided with a mating component of a Velcro connection. This take-up feature will supplement the main collar tightening feature as the latter is fastened.

Referring to FIG. 4, to accommodate nacelles which may have unusual structural features, the shroud can be altered by the addition of cutaway sections in the collar or the conical body. Alternately, such cutaways can be provided with fastening means such as Velcro connectors, or the like.

It is understood that although modifications and variations of the invention can be made without departing from the spirit and scope thereof, only such limitations should be imposed as are indicated in the appended claims.

I claim:

1. The combination with an aircraft having a wing mounted engine and an elongated nacelle which encloses said engine having a circumferential rim at one end thereof defining a discharge port for engine exhaust gases, of a flexible shroud removably engaging said elongated nacelle to define a closure across said discharge port for exhaust gases, and means forming a collar on said shroud being adjustable to form a tight engagement with said nacelle, and means on said flexible shroud to elevate the shroud a sufficient height to engage said engine nacelle.

2. In the combination as defined in claim 1, including at least a pair of elevating members depending from said shroud to permit elevating the shroud to a sufficient height to engage the nacelle.

3. In the combination as defined in claim 1, wherein said means to elevate said shroud includes at least two lifting rods depending therefrom.

4. In the combination as defined in claim 3, wherein said at least two lifting rods depend from said shroud adjustable collar.

5. In the combination as defined in claim 4, wherein said at least two lifting rods are disposed at opposite sides of said shroud.

6. In the combination as defined in claim 1, wherein said means to elevate said shroud includes a rod socket depending from opposed sides of said adjusting collar, each rod socket being adapted to register a lifting rod therein.

* * * * *